Figures 1, 2, 3:
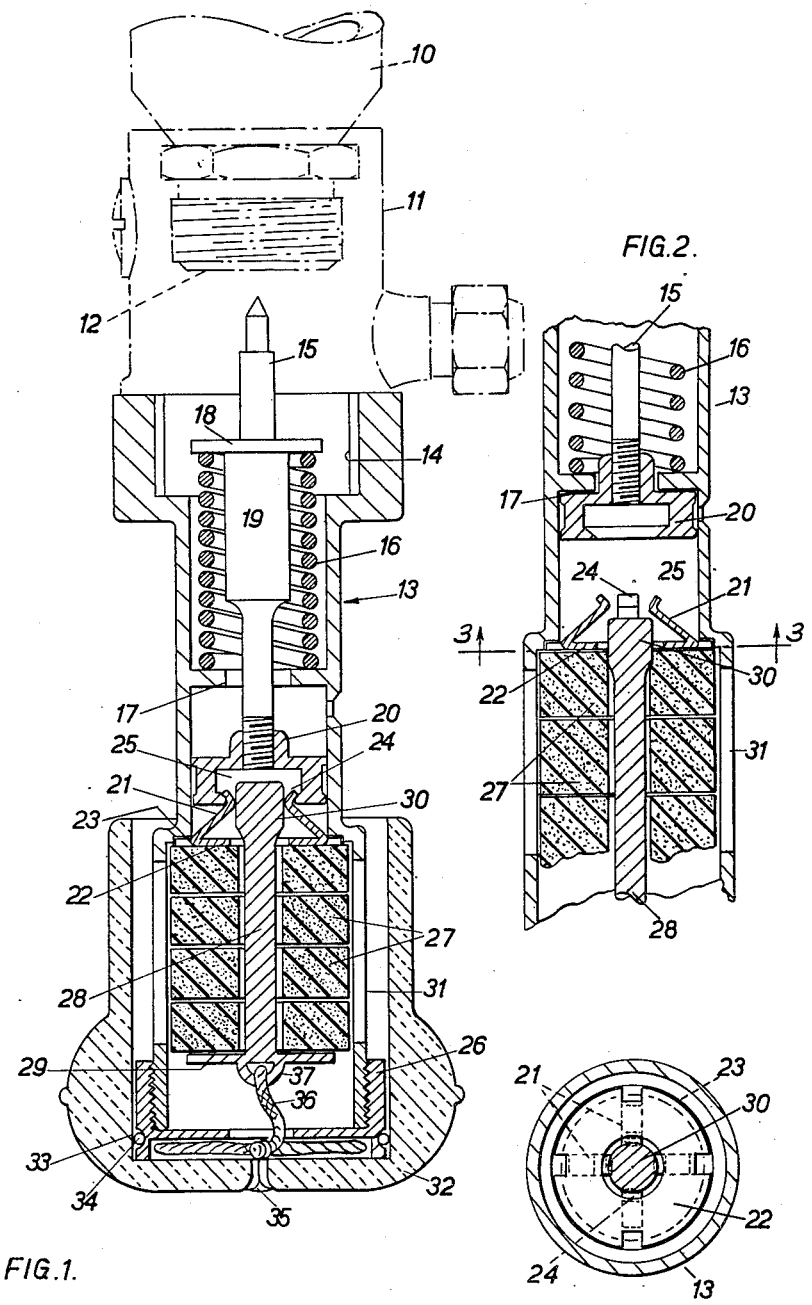

April 17, 1962    J. SILVERSTONE ETAL    3,029,982
IMMERSION-RESPONSIVE ACTUATOR FOR VALVES OR OTHER DEVICES
Filed March 11, 1958    2 Sheets-Sheet 1

INVENTORS
Joseph Silverstone
Ian Brodie Wright
BY
ATTORNEY

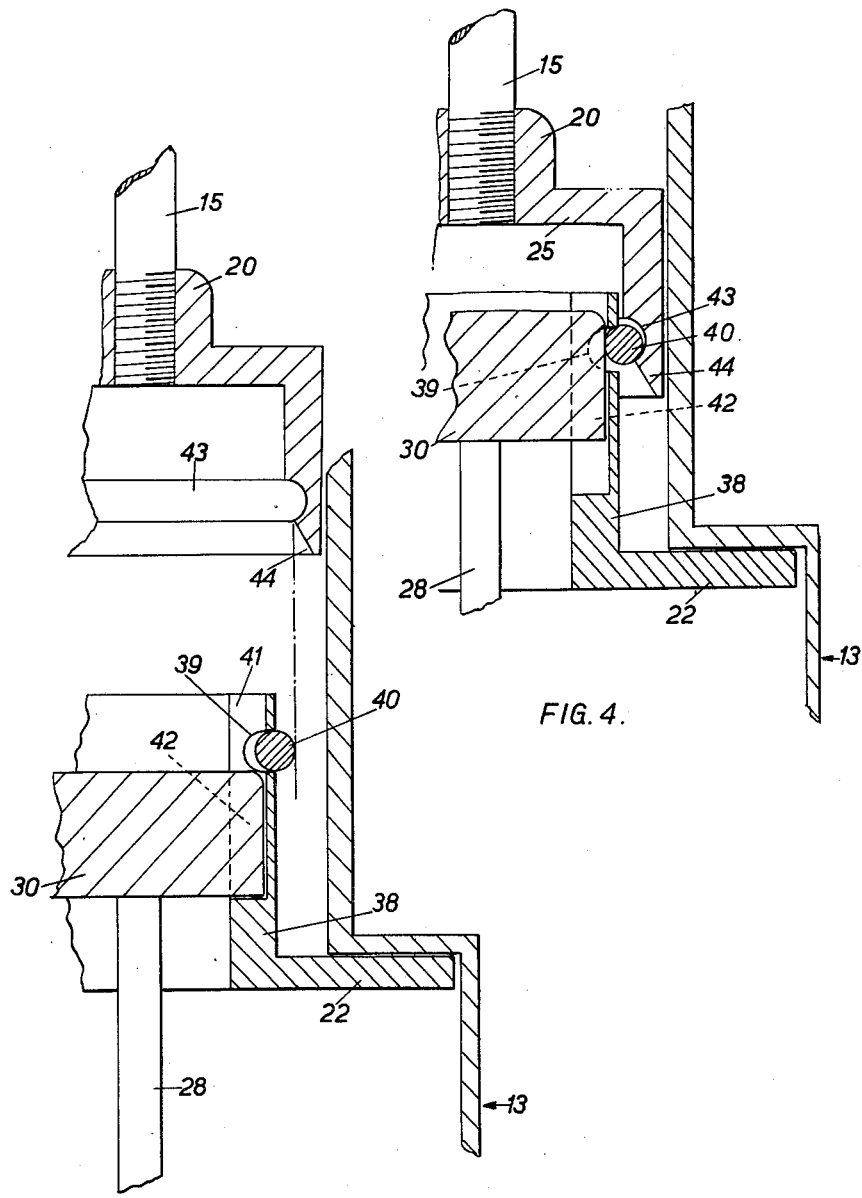

United States Patent Office 3,029,982
Patented Apr. 17, 1962

3,029,982
IMMERSION-RESPONSIVE ACTUATOR FOR VALVES OR OTHER DEVICES
Joseph Silverstone, Marple, and Ian Brodie Wright, Hazel Grove, England, assignors to P. Frankenstein & Sons (Manchester) Limited, Manchester, England, and the said Joseph Silverstone
Filed Mar. 11, 1958, Ser. No. 720,640
Claims priority, application Great Britain Mar. 19, 1957
7 Claims. (Cl. 222—5)

This invention is concerned with a new and improved immersion-responsive actuator for valves or other devices, such actuator being particularly, but not exclusively, applicable as a means for effecting the automatic release of compressed gas into inflatable parts of marine lifesaving equipment.

In this connection it is known practice to store the carbon dioxide or other gas in a metal "bottle" and to interpose between the latter and the inflation tube of the equipment a diaphragm or non-return valve adapted, on entry of such equipment into the water, to be opened by a pin whose actuation is brought about either by a spring previously held stressed by a soluble plug, or by the pressure upon a piston of gas derived from an effervescing salt.

Both these known methods of automatically actuating the gas-release pin have serious drawbacks in practice. For example, the soluble plug is liable to be fractured and permit unintended inflation of the equipment should the latter be roughly handled, besides which its replacement necessitates a thorough stripping and cleaning of the actuator to avoid risk of corrosion, and furthermore the spring-loaded plunger is not readily adapted for operation by an overriding manual control.

The gas-actuated piston of the other known device is less difficult to operate by manual means, but the salt charge is tedious to renew, adversely affected by atmospheric moisture, and may fail to produce any effective gas pressure should foreign matter in the water prevent seating of the non-return valve through which such water has access to the charge.

The object of the present invention is to provide an improved immersion-responsive actuator which, as applied to the self-inflation devices of marine lifesaving equipment, has none of the disadvantages aforesaid, inasmuch as its critical component is virtually indestructible, remarkably stable in conditions of very high humidity, reliable in operation, and easily renewed after use.

The actuating means forming the subject of the invention has numerous advantageous applications other than the one just-mentioned and some of these will be indicated hereinafter.

According to this invention the improved actuator incorporates as its critical component a mass of porous material which, whether initially compressed or not, has the property of swelling strongly on absorption of free liquid thereby.

Such absorbent material conveniently comprises one or more pieces of a highly-compressed synthetic sponge capable of substantially increasing its original volume in the presence of a proportionate amount of free liquid.

The expansion force developed by the absorbent material on immersion may be caused to release a spring-loaded member, such as the striker pin associated with a gas bottle, or alternatively, and especially if the initial thrust energy and rate of expansion be increased by gas generated within the material from a suitable chemical, the pressure developed may be applied directly to the striker pin or its equivalent.

In the accompanying drawings:
FIG. 1 is a sectional side elevation of one form of automatic inflation device embodying the present invention and shown in "cocked" condition,
FIG. 2 is a fragmentary view corresponding to the central part of FIG. 1 but showing the mechanism after "firing,"
FIG. 3 is a section on the line 3—3 of FIG. 2,
FIGS. 4 and 5 are fragmentary views drawn to an enlarged scale showing a modified construction of the mechanism in its "cocked" and "fired" conditions, respectively.

In the example illustrated in FIGS. 1 to 3, the improved actuator is applied to the self-inflation means associated with an inflatable lifejacket, to effect automatic inflation of the same immediately upon its entry into the water, such provision (as opposed to manually-initiated inflation) being highly desirable where there is risk of the user of the equipment suffering immersion while unconscious. Provision for automatic inflation upon immersion is, of course, virtually essential in the case of larger items of equipment such as rafts or dinghies designed to be dropped from aircraft to survivors, or jettisioned from ships.

The gas-storage bottle for inflation of the lifejacket or other article indicated at 10 and shown provided with the usual adaptor 11 permitting its detachable connection to the inflatable portion of the equipment and incorporating a diaphragm seal 12 or ball non-return valve.

The body 13 of the automatic inflation device is of generally cylindrical form but has one end enlarged and internally threaded at 14 to screw on to the adaptor 11 in place of the normal manual release fitting, the usual striker or unseating pin 15 being disposed coaxial with such body and biased towards the sealed end of the bottle 10 by a coil spring 16 compressed between an annular partition 17 in the body and a shoulder 18 on a central enlargement 19 of the pin 15.

The tail end of such pin extends through the body partition 17 and has screwed thereto a circular block 20 which is normally located by a set of spring fingers 21 mounted within the body 13 and which serves, when disengaged from the latter, to limit axial travel of the pin 15 under the influence of the spring 16.

The spring fingers 21 are conveniently formed integral with an annular metal plate 22 seated upon a shoulder 23 in the outer end of the body and extend in angularly spaced, mutually-convergent relation so that their free ends, which are outwardly directed at 24, can be disposed within an undercut central recess 25 in the adjacent face of the block 20.

Also located with the outer end of the body 13 and retained by a screw-cap 26 thereon are a plurality of (say, four) superimposed washers 27 of the compressed synthetic sponge already referred to, these washers being slipped onto a coaxial road 28 having at one end a flange or abutment plate 29 and at the other end a rounded head 30 whose interposition between the free ends of the spring fingers 21 causes the latter to be held in locking engagemet with the undercut inner periphery of the block 20, and hence retains the striker or unseating pin in "cocked" condition as shown in FIG. 1.

It has been found convenient to produce the absorbent washers 27 by cutting or punching the same from a sheet (say, 3/16 inch thick) of methyl cellulose sponge, the central hole in each being as small as possible consistent with admitting the head 30 of the rod 28.

The expansion rate and developed thrust during the first few seconds after immersion of the sponge material may be increased by pre-treatment of the latter with a gas-generating chemical, or alternatively with a wetting agent, such as alkyl aryl sulphonate.

The substantially unidirectional expansive thrust obtained from the compressed sponge washers 27 is utilized to trigger or "fire" the spring-loaded striker or unseating pin 15, ingress of water to such washers through apertures 31 in the body 13 of the device, and/or in its end cap 26 causing them to react against the flange or abutment plate 29 on the rod 28, whose head 30 is thereupon withdrawn from between the spring fingers 21 to allow the latter to release the pin against the diaphragm 12 or ball sealing the gas "bottle" 10 (see FIG. 2).

With the arrangement above described, no fine clearances are necessary and there is no risk of the device being rendered unserviceable or inadvertently operated by rough handling or inertia shock loading, especially in view of the lightness of the absorbent washers 27 and their supporting rod 28, which latter may be a nylon moulding. Furthermore, the recharging of the device with fresh washers after use is a simple operation.

The device illustrated in FIG. 1 incorporates an overriding manual control comprising a known form of moulded operating handle 32 adapted to embrace the apertured outer end of the body 13 and to be frictionally located by means of a circlip 33 engaging a circumferential groove 34 in the screw-cap 26. A central rivet 35 in the closed end of this handle 32 is connected by a cord 36, passing through a hole in the cap 26, to an eye 37 at the outer extremity of the rod 28, so that the device can be "fired" simply by pulling the handle 32 away from the body 13.

Should it be desirable to render the device manually operable from a remote position (for example, to inflate a liferaft) the handle may be connected to one end of a Bowden cable or the equivalent whose other end is detachably secured to the rod 28 and whose casing abuts against the cap 26.

Undesired "firing" of the device, resulting from accidental (as distinct from operational) immersion thereof, may be prevented by a sleeve fitting closely around the apertured end of the body 13, this sleeve having apertures which can be turned into register with the body apertures 31 to permit automatic working of the device. The end cap 26 may be replaced by a screw-plug to enable the operating handle 32 to represent the shutter sleeve above mentioned.

In the modified construction illustrated in FIGS. 4 and 5, the inwardly directed spring fingers 21 of the plate 22 are replaced by a hollow cylindrical boss 38 having a circumferential groove 39 which accommodates an external circlip 40. Angularly spaced recesses 41 within the boss 38 are slidably engaged by complementary radial lugs 42 on the head 30 of the rod 28, and these recesses break into the groove 39, so that, in the "cocked" condition of the mechanism, the lugs 42 hold the circlip 40 expanded and in engagement with a circumferential groove 43 within the hollow block 20. When the rod 28 is urged outwards by swelling of the absorbent washers (not shown) the lugs 42 release the circlip 40 which thereupon retracts itself within the groove 39 and releases the block 20, whose edge is preferably bevelled at 44 to facilitate its engagement over the circlip 40 when the device is being re-set in "cocked" condition.

It is envisaged that, by using compressed sponge washers or pieces of a relatively larger surface area than those illustrated and preferably impregnated with a stable, nontoxic effervescing salt, introduced either by injection or by immersing the sponge in a solution thereof and thereafter expressing the solvent, sufficient thrust may be developed to permit the striker or unseating pin 15 being advanced by the direct action of the expanding sponge applied through a rigid pressure plate, and so enable an exceedingly simple automatic inflation device to be produced.

Although the improved automatic actuator has been particularly described with reference to the inflation of lifesaving equipment, the invention is obviously applicable in numerous other situations where a valve, switch or other device requires to be actuated automatically in response to the occurrence of flooding, and it is envisaged that a suitably adapted immersion-responsive actuator on the lines proposed will be particularly valuable in cases when the automatic operation of warning or rectification systems by electrical means is prevented by failure of the supply current or rendered unsafe through the existence of an explosive atmosphere.

We claim:

1. An immersion responsive actuator for valves or the like comprising a hollow body open at one end, means at said one end for attachment to a device having a valve, an actuating pin within said body and extending toward said valve, said pin being biased toward said valve by a spring having one portion contacting said pin and another portion contacting said body, means for holding said pin out of contact with said valve comprising a block secured to said pin, a circumferential recess in said block, a spring member engaging said recess and holding said block in inoperative position, a mass of porous material having the property of swelling on absorption of free liquid in said body, said spring member maintaining said porous material in compressed state, said material upon swelling releasing said holding means.

2. An actuator according to claim 1 wherein said block is provided with a groove on the inside thereof, a head on said material having a cooperating groove, a circlip between said lip and said head adapted to operate in said grooves, said head holding said fingers in engagement with said lip.

3. An actuator according to claim 2 wherein a rod is connected to said head, a plate at the remote end of said body is secured to said rod, said material between said plate and fingers whereby the swelling of said material presses on said plate to retract said rod and release said means.

4. An actuator according to claim 3 wherein there is provided a handle at the end of said body remote from said pin, and a connection between said rod and said handle whereby retraction of said handle retracts said head and releases said means.

5. An immersion-responsive actuator according to claim 1, further characterised in that the said material is formed from methyl cellulose.

6. An immersion-responsive actuator according to claim 1, further characterised in that the said material is pretreated with a gas-producing ingredient.

7. An immersion-responsive actuator for valves and the like, comprising a mass of highly-compressed synthetic sponge adapted to swell strongly on absorption of liquid, a body housing said mass but permitting access of liquid thereto, a spring-loaded member movable within said body, and spring retaining means whereby said member is normally held in cocked condition, said retaining means holding said sponge in compressed state, the swelling of said mass on absorption of liquid effecting release of said retaining means and hence of said spring-loaded member.

References Cited in the file of this patent

UNITED STATES PATENTS

| | | |
|---|---|---|
| 1,117,639 | Cooey | Nov. 17, 1914 |
| 2,120,248 | Hinchman | June 14, 1938 |
| 2,202,225 | Murray et al. | May 28, 1940 |
| 2,675,144 | Eliakann | Apr. 13, 1954 |
| 2,684,784 | Fox | July 27, 1954 |
| 2,693,781 | Opp | Nov. 9, 1954 |
| 2,786,599 | Higbee | Mar. 26, 1957 |